RE 25679

SYSTEM FOR ANALYSING THE SPATIAL DISTRIBUTION OF A FUNCTION

Filed Feb. 13, 1956 7 Sheets-Sheet 1

Inventor
WILFRED K. TAYLOR
By
Wenderoth, Lind & Ponack
Attorneys

SYSTEM FOR ANALYSING THE SPATIAL DISTRIBUTION OF A FUNCTION

Filed Feb. 13, 1956 7 Sheets-Sheet 2

*Inventor*
WILFRED K. TAYLOR
*By*
Wenderoth, Lind & Ponack *Attorneys*

Inventor
WILFRED K. TAYLOR
By
Attorneys

SYSTEM FOR ANALYSING THE SPATIAL DISTRIBUTION OF A FUNCTION

Filed Feb. 13, 1956

Inventor
WILFRED K. TAYLOR
By
Wenderoth, Lind & Ponack Attorneys

SYSTEM FOR ANALYSING THE SPATIAL DISTRIBUTION OF A FUNCTION

Filed Feb. 13, 1956 7 Sheets-Sheet 5

Inventor
WILFRED K. TAYLOR
By
Wenderoth, Lind & Ponack Attorneys

Inventor
WILFRED K. TAYLOR
By
Wenderoth, Lind & Ponack Attorneys

Inventor
WILFRED K. TAYLOR
By
Wenderoth, Lind & Ponack
Attorneys

United States Patent Office 3,016,518
Patented Jan. 9, 1962

3,016,518

SYSTEM FOR ANALYSING THE SPATIAL DISTRIBUTION OF A FUNCTION

Wilfred Kenelm Taylor, London, England, assignor to National Research Development Corporation, London, England Filed Feb. 13, 1956, Ser. No. 565,272
Claims priority, application Great Britain Feb. 14, 1955
11 Claims. (Cl. 340—149)

This invention relates to a system for analysing the spatial distribution of a variable quantity or function and for effecting a selective response to characteristic patterns in such distributions.

In one aspect the invention consists in a system for analysing a single or multi-dimensional distribution of a variable quantity or function (for example temperature, pressure, voltage, current, field strength, etc.) in which signals are derived in such a manner that the largest signals are obtained from those parts of the distribution where the function changes in magnitude or spatial configuration while only small or zero signals are obtained from regions over which the function is relatively constant.

For this purpose there may be provided apparatus including means for obtaining signals from sample points in the space occupied by the function and means for modifying the magnitude of each signal in accordance with the magnitude of signals obtained from selected adjacent points in the space.

The signals may be obtained from a plurality of spatially distributed transducers and the output signal from each transducer may be applied with or without modification to control the amplitude of the output signals from a selected number of the transducers in the vicinity.

The invention further provides a system for the automatic recognition of characteristic patterns in a single or multi-dimensional distribution of a variable quantity or function in which signals representative of the magnitude of the quantity or function, obtained from points in the distribution, are used to activate memory or storage units in such manner that selective responses are obtained for desired characteristic patterns in the distribution of the quantity or function.

If desired the signals may first be modified in such manner that the largest signals are obtained from those points in the distribution where the quantity or function changes in magnitude or in spatial configuration while only small or zero signals are obtained from those points in the distribution where the quantity or function is relatively constant.

Figure 1:
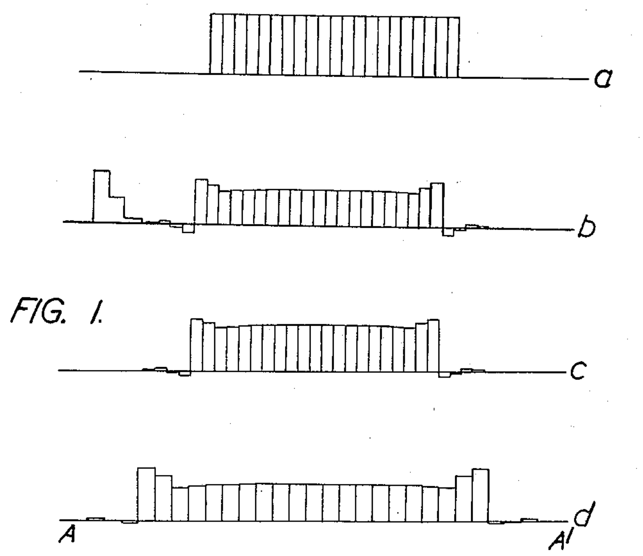
Figure 2:
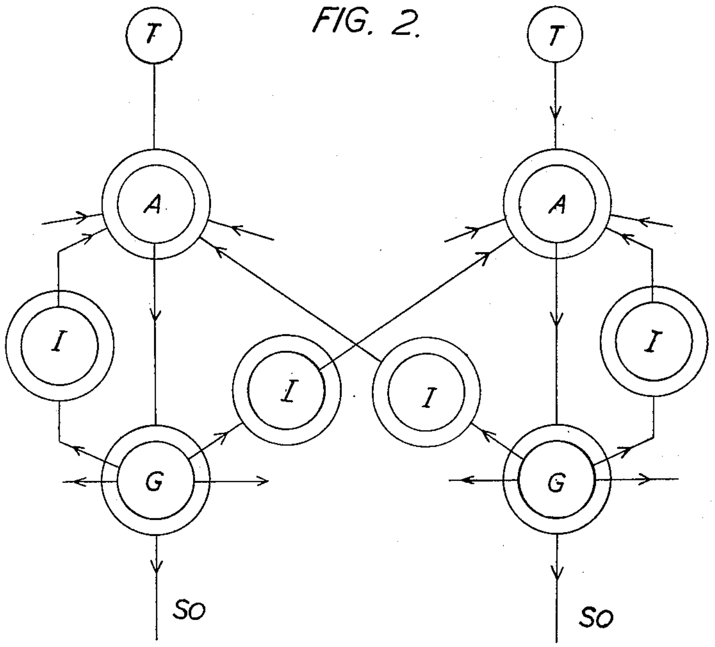
Figures 4, 4A:
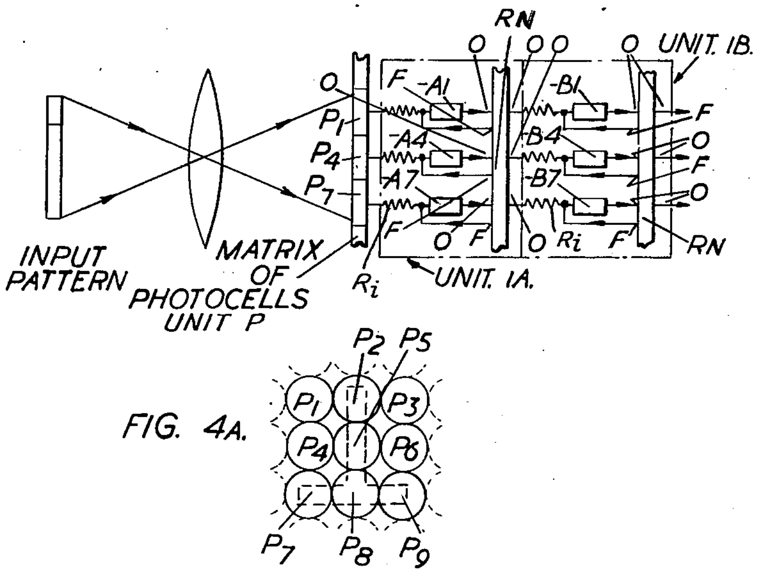
Figure 8:
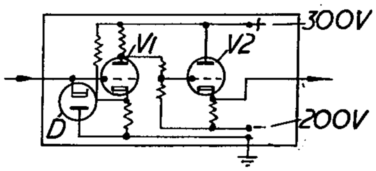
Figure 3:
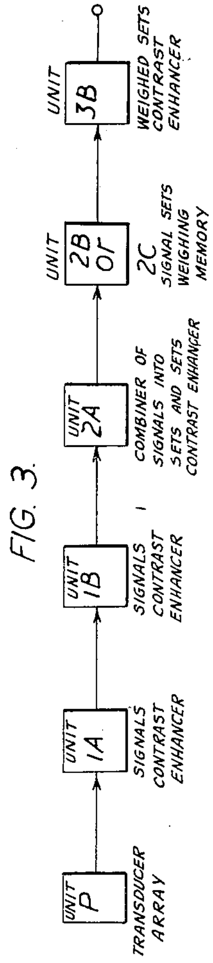
Figures 5, 6:
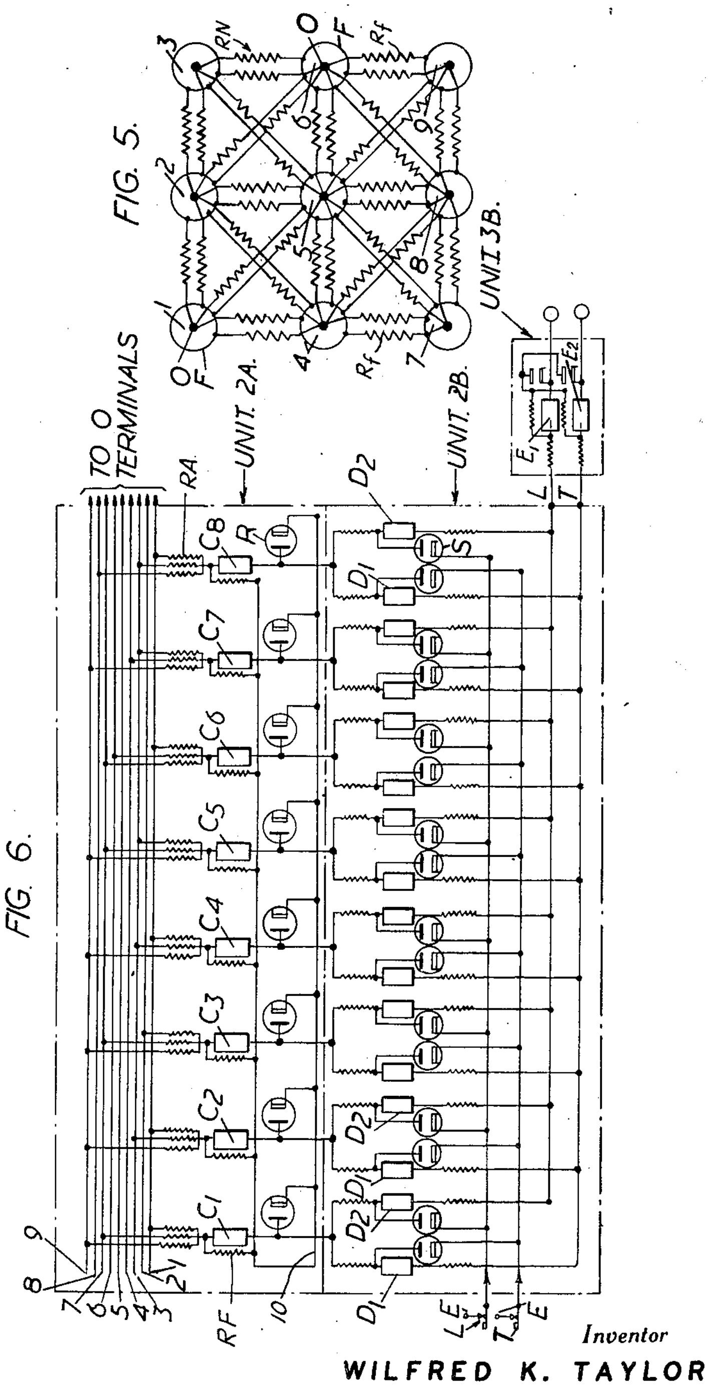
Figure 9:
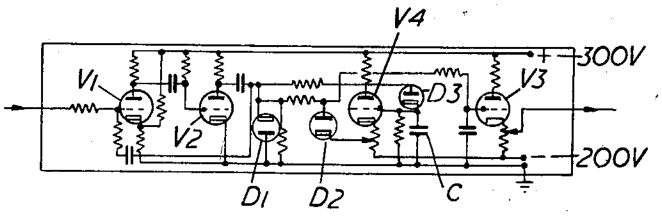
Figure 10:
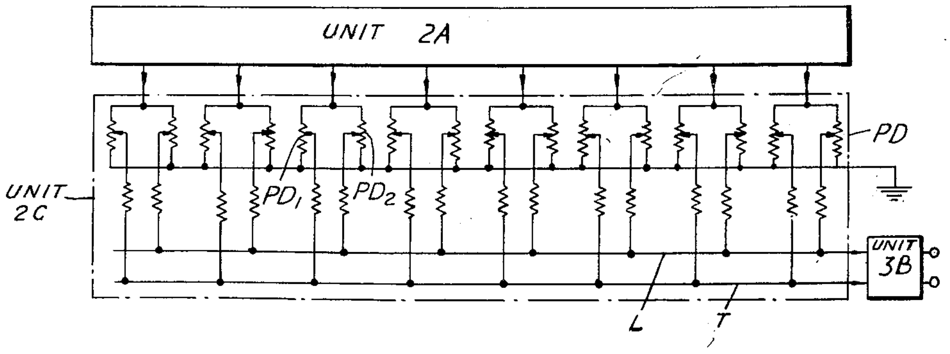
Figure 14:
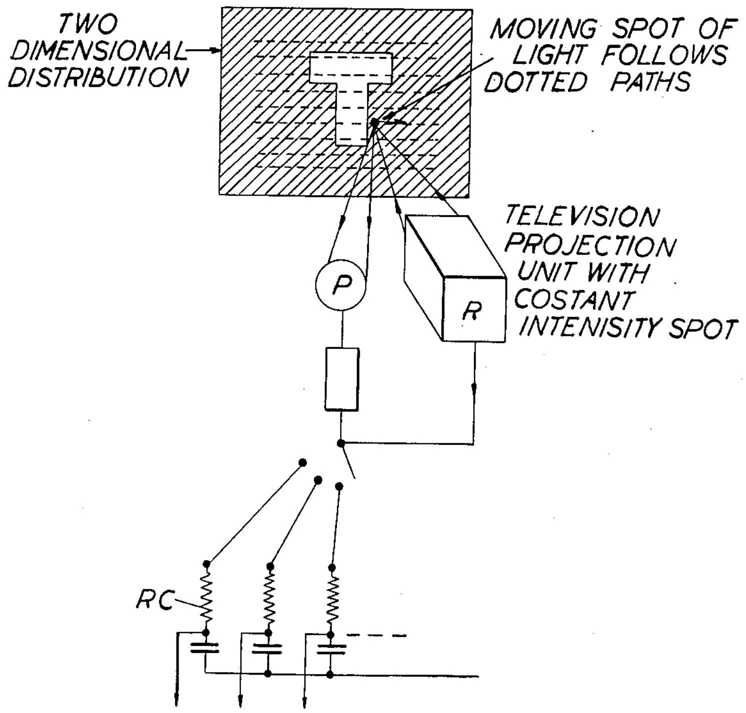
Figure 15:
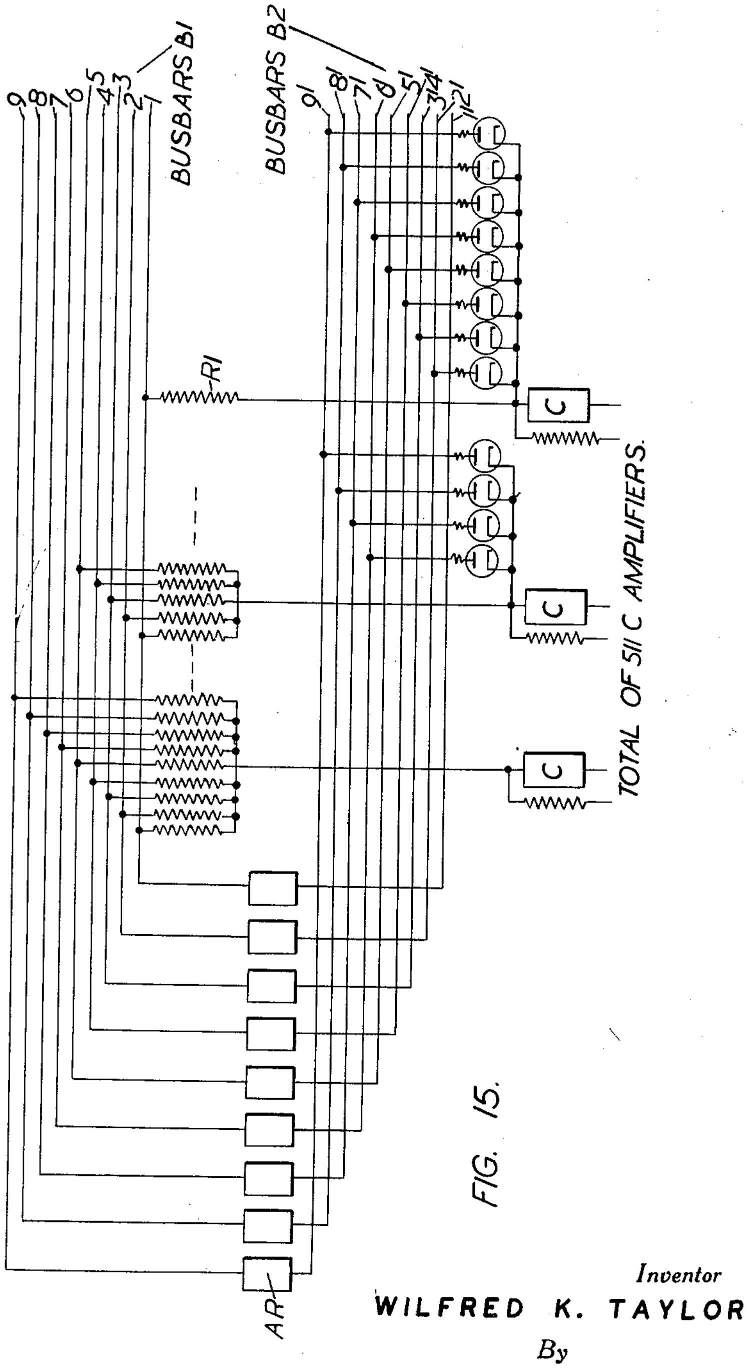

Some forms of system in accordance with this invention will now be described with reference to the accompanying drawing, in which:

FIGURE 1 is an explanatory diagram,

FIGURE 2 is a diagrammatic representation of part of a system in accordance with the invention, FIGURE 3 is a block diagram of a complete system in accordance with the invention, FIGURE 4 shows diagrammatically the units 1A and 1B of the system of FIGURE 3, FIGURE 5 shows a resistance network forming part of the unit 1A and the unit 1B, FIGURE 6 shows diagrammatically the units 2A, 2B and 3B of the system of FIGURE 3, FIGURES 7, 8 and 9 show wiring diagrams of amplifiers used in the system of FIGURE 3, FIGURE 10 shows an alternative to the unit 2B of FIGURE 3, FIGURES 11, 12 and 13 show by way of example the application of the system of this invention to the recognition of specific variables, FIGURE 14 illustrates diagrammatically a modification of the system in which a two-dimensional distribution is reduced to a one-dimensional distribution prior to analysis, and FIGURE 15 illustrates a further modification of the system.

In carrying out the invention, signals are first obtained from sample points in the space occupied by the function. For this purpose a suitable set of transducers may be employed, or alternatively a single transducer in the form of a continuous medium such as magnetic material or a photo-sensitive layer may be used. By operating on the signals and causing them to interact, a set of modified or weighted output signals possessing the desired properties may be obtained. To illustrate the method it will be assumed that the function exists in two dimensions and describes the light intensity over a surface illuminated only by a white square of unit intensity, the rest of the surface being black, that is to say of zero intensity.

For the sake of example it will be assumed that the surface area is quantized into small squares and that the white square measures 21 x 21, so covering 441 small squares. A suitable set of transducers, one for each small square, are arranged each to produce a signal which is a function of the average light intensity on its associated small square, the signal output for one line of transducers across the square being as shown in FIGURE 1*a*.

As shown in FIGURE 2, the signal from each transducer T is passed into an adding device A, there being one such adder for each signal. It should be noted that subtraction may be obtained by adding a negative quantity. Each adder has multiple inputs in general, the signal being one of them. The outputs from the adders are passing to transfer units G which give multiple outputs. One of the outputs is the required signal $S_0$ and the remaining outputs are passed through different transfer units I each to one of the adder units A, four of such connections being shown in FIGURE 2. The term transfer unit is used to cover attenuators, amplifiers, modulators, cathode ray tube assemblies, and any other transducers or networks that can be made to simulate the required signal characteristics. By suitably connecting the output signals from the transfer units G through the transfer units I with the adder units A, and by an appropriate choice of transfer units it is possible to obtain output signals from the edges or corners or other specific features of any distribution. Thus, in the example, the largest signals from the transducers are obtained from the corners of the white square, intermediate amplitude signals from the edges, and small signals from the centre as shown in FIGURE 1*b*, 1*c* and 1*d*, in which FIGURE 1*b* shows the final outputs from a row of transducers at the edge of the square, FIGURE 1*c* shows that from a row of transducers across the centre of the square, and 1*d* shows that from a diagonal row of transducers.

The degree of contrast can be varied and if necessary all the signals except those from the corners can be reduced to zero. If it is known that the intensity distribution is one of a finite set, then the relative positions of the discontinuities may be quite sufficient information to operate an automatic recognition device. Thus by the use of this method the information handling capacity of the recognition device may be considerably reduced and the confusion which might arise due to overloading with unnecessary information avoided. It is clear for example that in order to distinguish between a square, a triangle, and a hexagon, only the number of corners need be counted. If, however, more detailed information is required, the necessary equipment is used more efficiently by reducing the original distribution to a "line diagram" form. A filled in circle for example does not have any corners but with the same connectivity as that used in the white square example gives larger signals round the periphery. When the original distribution is made up of a number of isolated points, the final distribution is of the same form.

The general principle employed in bringing about the desired modification of the original signal distribution can be described by mathematical equations. Thus the equations describing the continuous distribution of signals are of the form $$S_o = G(S_i + \int_s IS_o ds) \quad (1)$$

and may be simulated by any continuous medium in which the two variables $S_i$ and $S_o$ satisfy this relationship for the required distribution of the G and I functions. If the orginal signals $S_i$ are only available at a set of discrete points such as the output terminals of a set of photoelectric cells or other transducers, the integral Equation 1 can be replaced by a set of equations of the form $$S_{on} = G_n(S_{in} + \sum_P I_{kn} S_{ok}) \quad (2)$$

These equations must be satisfied simultaneously by $S_{on}$ for all values of "$n$" and could equally well be expressed by a matrix. The solution would then be given by the inverse of a matrix or the ratio of two determinants. The function P defines the connectivity of the transfer units I. The results shown in FIGURE 1 were obtained by making all the transfer units I operate as phase inverters and as attenuators giving an output equal to $-1/25$ of the input, and the P function such that each adder unit receives inputs, by way of transfer units, from all outputs that are obtained from squares having more than half their area within the circle of radius two square sides, centred on the square connected to the particular adder unit under consideration. This same condition applies to all adder units irrespective of position. The value of "$G_n$" was unity for all values of "$n$" and a greater contrast could have been achieved by making the "G" transfer functions non-linear so that only positive outputs could occur. In most applications it will be preferable to restrict the outputs to one sign, although this increases the difficulties of analysing the response mathematically.

The transfer units I provide a useful method of regulating the properties of the system. When the gain of these units is small, the output distribution is practically the same as that at the input. When the gain is large and positive, the discrimination of the system is poor but the sensitivity is high and if the gain is too high the system becomes unstable. The selective effect that is useful in obtaining signals from discontinuities occurs when the gain of each unit is negative and has a magnitude that depends on the P function. In certain applications it may be advantageous to vary the I, G and P functions manually or to arrange for the signals to vary them as by a form of automatic gain control. Any possible P function can be simulated by inserting all the transfer units I initially and then causing the attenuation of any particular unit to become infinite if it is no longer required in the system. By letting $k$ and $n$ in Equation 2 take all values from 1 to N where N is the total number of sample points, it can be seen that a total of $N^2$I units will satisfy any possible arrangement of connectivity in a system of this type. In most applications the I functions will be negative quantities and the G functions positive quantities when the input to the G unit is positive, and zero when the input is negative. All the I and G transfer units may be identical and there may be sufficient I units to connect each of the G unit outputs to each of the adder units by way of an I unit. If the input signals to such a system have an amplitude distribution it can be shown that under suitable conditions there is a tendency for the differences in amplitude to be exaggerated and in the limit the system parameters can be adjusted so that only the largest signal produces an output. With intermediate settings of the gain of the I and G transfer units the second, third, etc. largest signals will also produce output.

The system may also include apparatus for effecting a selective response to characteristic patterns in a distribution of the variable quantity or function. In some cases this apparatus will be arranged substantially in the same manner as that described with reference to FIGURE 2. The adder units A, however, will in general have multiple signal inputs in addition to the signals coming from the transfer units I. To illustrate the functioning of this part of the system it will be assumed that it is supplied with inputs from two separate sets of signals, set 1 and set 2. The first set can be regarded as the output signals from the first part of the system which may be as described above and the second set as code signals representing certain desired patterns in the single or multiple distributions in the first set.

As an example of the possible applications of this invention it will be assumed that a system is required that will automatically recognise objects of a certain type irrespective of their precise shape, size, or angle of presentation. Particular examples are the silhouettes of aircraft or letters of the alphabet. It will be assumed that the silhouettes have at most N regions of discontinuity or that N or less sample points on the outline are sufficient to distinguish between members of the set of shapes under consideration. The signals of set 1 represent the outline or discontinuities and the code signals of set 2, say M in number, can represent types of aircraft or letters of the alphabet. Since the system is assumed to be of the discrete sampling type it will have a limiting resolution and the shapes must be enlarged if necessary until the minimum distance between discontinuities is greater than, say, D.

Sets of signals from the output of the first part of the system described above are grouped together in such a way that the sets contain N or less signals selected from points separated by a distance greater than or equal to D. All such sets are obtained and each set is supplied to M adder units together with one of the code signals or set 2 at a suitable amplitude. The system may now be set up by projecting an image of each shape in all its possible positions on to the system of transducers in the first part of the system while simultaneously supplying the appropriate code signal at the set 2 inputs in the second part of the system. The combined effects of the two sets of signals will produce changes in the I or G transfer units or in the added unit A, the magnitude of such changes depending mainly on the time of presentation of either or both of the signals and/or the number of such presentations, and possibly also on the magnitude of the signals. Each pair of inputs will need to be maintained for such a time that the change produced in the I or G transfer units or in the A units is significantly greater than any random changes that may be present. When this coding process is completed the projection of an aircraft or letter on the transducers will produce a specific signal distribution at the output and the maxima of this distribution will indicate the code signal representing the object. Thus, instead of designing the system to recognise a particular set of objects, it is designed on general principles and adapted to any specific function by supplying the appropriate information to the inputs.

If, for example, speech is first analysed into its frequency components and these are displayed in the form of a "visible speech" time spectrogram, then the system described above can also be used for speech recognition by replacing the light intensity signals by sound intensity signals displayed on a two-dimensional frequency-time plane. The number of speech sounds or words that can be recognised in a single presentation will depend on the number of sample points supplying signals to the system and the number of units available for storing information during the setting up process. This system can be set up to recognise a set of sound sequences, such as speech sounds, either by setting up the units of the memory system on the basis of known statistical information or by allowing the units to set themselves automatically as samples of the sounds and their representative codes are supplied to the system. The sounds may be transformed into electrical signals which can then be recoded into a suitable form for feeding into the recognition system. Each sound sequence pattern will be represented by a code signal at a second set of inputs and the interaction of the two sets will cause an association to be established so that eventually the sounds alone will produce output signals corresponding to the set of code signals. For simplicity the output signals could have a one to one correspondence with the code signals. In general, the information stored represents the average signal characteristics of each sound and the recognition function is based on the fact that a particular sound produces an effect that corresponds more closely to one code signal than to any of the others. It is thus possible for a number of different speakers to say the same word in slightly different ways and still produce the correct output. In a similar way a visual pattern such as a letter of the alphabet may vary in style and yet produce the correct output because it is more closely associated with that output than with any other. Thus the output code signals from the recognition units will in general have different amplitudes and the maximum amplitude will indicate the correct output. In some cases the maximum output signal will not differ significantly from some of the others and it is therefore advantageous to amplify the amplitude contrast. This can be accomplished by passing the outputs from the memory system through a set of units similar to those used in the information selection and memory systems.

The connectivity of the amplitude contrast magnifier differs from that of the information selective system in that each unit has a negative feedback connection to all the other units instead of just to nearby units. Some simplification can be obtained by connecting all the I transfer units with a common busbar. In such case an additional I unit connecting a single G unit with its associated A unit may be arranged to provide positive feedback.

Figure 7:
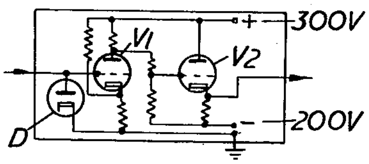

A complete system for effecting a selective response to characteristic patterns in a distribution of the variable quantity or function will now be described with reference to FIGURES 3–10 of the accompanying drawings, FIGURE 3 showing the system as a block diagram while FIGURES 4, 5 and 6 show various units of the system, FIGURES 7, 8 and 9 show details of the amplifiers used in the units, and FIGURE 10 shows an alternative arrangement of one of the units.

Referring firstly to FIGURE 4A, there is shown an array of nine transducers, namely photo-electric cells P1–P9 on to which an image of a pattern can be projected by optical projection means. It will be appreciated that in practice a greater number of photo-electric cells may be used and the number shown has been selected merely to avoid undue complexity in the figures. It will also be appreciated that the transducers need not be laid out in the checker board pattern shown. They may, for example, be laid out in a honeycomb pattern and such arrangement has certain advantages.

FIGURE 4 shows the left-hand row of the array of photo-electric cells, namely the cells P1, P4 and P7. The output of each cell is applied to the input of its respective adder unit A1–A9 through an input resistor R*i*. In this case these adder units are amplifiers of the kind described below with reference to FIGURE 7 and which amplify and produce a phase reversal of an applied negative signal but give zero output for positive signals. The output of each amplifier is applied to respective terminal O in a resistance network RN and negative feedback signals for each amplifier are obtained from this network from respective terminal F.

A typical resistance network is shown in FIGURE 5. Here, the centre of each circle constitutes the terminal O and there are nine such terminals corresponding to the amplifiers A1–A9 and the photo-electric cells P1–P9. The circle itself represents the terminal F which likewise corresponds in number to the amplifiers A1–A9 and constitutes the feedback terminal for the respective amplifier. In the network each terminal O corresponding to one of the photo-electric cells is connected through feedback resistors R*f* with each adjacent terminal F corresponding to photo-electric cells which are adjacent in the array to the first cell, that is to say, the terminal O5, for example, is connected through feedback resistors R*f* with all the terminals F1–4 and F6–9. Likewise the terminal O4 is connected with the terminals F1, 2, 5, 7, 8 and if the array of photo-electric cells were extended, would be connected with the three terminals F that would lie in the vertical row lying to the left-hand side of the row 1, 4, 7. It will be understood that these resistances correspond to the thransfer units I of FIGURE 2. It is contemplated that in some circumstances and when a larger array of photo-electric cells is used, that each terminal O would be connected not only to the next adjacent terminal F but also to the next further terminal F in each direction, that is to say, for example, the terminal O1 would be connected not only with the terminal F2 but also to the terminal F3, and so on, through appropriately dimensioned resistance. By this system of interconnection, each amplifier A receives as feedback a signal which is influenced by the outputs of the amplifiers feeding all the neighbouring terminals O and accordingly the output of an amplifier, the photo-electric cell of which is fully illuminated, will be proportionally greater than the output of the amplifier the photo-electric cell of which is only partly illuminated.

The output terminals of each amplifier in the unit 1A (FIGURE 4) are also connected with the input terminals of a similar series of amplifiers B1–9 in the unit 1B. These amplifiers, which may be of the kind described below with reference to FIGURE 8, amplify and produce a phase reversal of positive inputs but give a zero output for negative inputs. Their outputs are applied to the terminals O1–9 of a second resistance network RN which may be exactly the same as that shown in FIGURE 5, and similarly each amplifier is provided with negative feedback from the terminals F1–9 of that network.

The combined effect of the units 1A and 1B and the two resistance networks RN results in outputs being obtained at the output terminals O of those amplifiers B which correspond to a photo-electric cell on which a corner of the image is projected, whereas a smaller or zero output will be obtained from the other amplifiers B.

It will be appreciated that in some cases it may be sufficient to use a single unit, for example the unit 1A only. In other cases where greater contrast is required, one or more additional units may be provided as required.

A selective response to characteristic patterns is effected by units 2A, 2B and 3B which are shown together in FIGURE 6. In the unit 2A is a series of busbars 1–9 corresponding to and connected with the terminals O1–9 of the resistance network RN of the unit 1B, and these busbars are connected together in this particular example in groups of three through adding resistor networks RA which add the voltage on each group of three busbars and supply a voltage proportional to the sum to the input of respective amplifiers C. As shown, the grouping is effected by connecting together three busbars corresponding to those terminals O in the resistance network of FIGURE 5 which are not immediately adjacent one another, there being eight such groups in the example illustrated. As will be seen, the busbars 1, 3, 7 or 1, 3, 9 are connected together but the busbars 1, 3, 6 or 1, 3, 5, are not so connected since the terminals O3, O6 or O3, O5 are considered as being immediately adjacent.

The output of each amplifier C in the unit 2A is in part applied to an associated rectifier R and the combined outputs of the eight rectifiers is applied over the additional busbar 10 as negative feedback to all the amplifiers C through the resistors RF, the effect being that only those amplifiers having the larger inputs produce appreciable output.

The amplifier C in the unit 2A which gives the maximum output is accordingly that one which is connected with those terminals O in the resistance network RN which correspond with the photo-electric cells on which the corners of a projected pattern lie. Thus, for example, if the letter T is projected with the inversion thereof being the pattern received by photocells P1–9 (see FIGURES 4A), the terminals O2, 7 and 9 will show a maximum output and since these terminals are connected through the busbars 2, 7 and 9 to the resistor adding network supplying the input of the amplifier C3, this amplifier will produce a greater output than any other amplifier in this unit. If the letter T is inverted so that the photocells receive its projection right side up, the maximum output will then be from the amplifier C8 since the corners of the projected T will now lie on the photo cells corresponding with the terminals O1, 3 and 8. Thus, depending on the aspect of the projected T different amplifiers will show maximum output. It should be emphasized that for any given shape the same amplifier gives the maximum output irrespective of the intensity of the shape although the absolute amplitude of the output will in general be proportional to the intensity. In practice a photo-electric cell array using more than nine cells will probably be used and the number of C amplifiers may be large. It is accordingly convenient to arrange that a characteristic pattern, which may produce maximum output from many of the C amplifiers, is automatically recognised. For this purpose a further unit 2B, which functions as a memory unit, is provided.

In the form of this unit shown in FIGURE 6, the unit is arranged for simplicity to recognise one or other of two alternative patterns such, for example as a T and an L. Each output terminal of the amplifiers C1–8 in the unit 2A is connected to the input terminals of two alternative amplifiers D1 and D2. Thus when the T is projected on to the matrix of photo cells the third pair of amplifiers D1 and D2 receive the largest inputs. When the L is projected the amplifier C2 gives the largest output and the second pair of amplifiers D1, D2 receive the largest inputs. The conditions hold if the letters suffer considerable distortion in shape and intensity of illumination. The output of all the amplifiers D1 is connected to an output terminal T and the output of all the amplifiers D2 is connected to an output terminal L. Each of the D amplifiers may be of the kind described below with reference to FIGURE 9 and is arranged in such a manner that it has a gain for positive inputs which is directly proportional to the time integral of the input voltage. The anode of a rectifier S is connected with the input terminal of each amplifier while the cathodes of all the rectifiers associated with the amplifiers D1 are connected in common through a switch T to earth, and the cathodes of all the rectifiers associated with the inputs to the amplifier C2 are connected in common through a switch L with earth.

In setting up the system to recognise the pattern T, the switch T is opened so that the inputs to all the amplifiers D1 are not short-circuited by the rectifiers while the pattern T in all possible shapes and aspects is projected on to the photo cell array. When, for example the T of FIG. 4A is projected, amplifier C3 gives the largest output and when this is applied to the third D1 amplifier its gain is slowly increased. The gain ideally remains at the new value when the input is removed. The amplifiers D1 will then provide an output voltage to the terminal T when they receive an input from the associated C amplifier of the unit 2A and since the outputs will be proportional to the magnitudes of the outputs from the C amplifiers, and also to the time during which these outputs have been applied, the amplifiers D1 will become conditioned to amplify input signals derived from all patterns which look more like a T than another character such as an L, and when such a pattern is projected with both switches L and T open the output voltage at the terminal T will be largely due to the output of the C3 amplifier which provides a substantial output indicating that corners of the projected pattern lie on the photo cells 2, 7 and 9 corresponding to the O terminals which are connected with that amplifier. The output of the C3 amplifier is amplified by the third D1 amplifier, the gain of which was increased by opening switch T alone when the T was projected. The gain of the third D2 amplifier is zero and there is no output at the L terminal when the T is projected. The unit 2B is thus conditioned for selecting the T pattern.

In a like manner the unit may be conditioned for selecting the L pattern by opening the switch L so as to bring the amplifiers D2 into operation providing output voltages to the terminal L.

It will be apparent that a separate switch, amplifier and output terminal will have to be provided for each characteristic pattern which it is desired to be able automatically to recognise but only two sets are illustrated in the unit 2B for the sake of simplicity. After the setting up is completed, the switches T and L may be left open and output voltage will be obtained at the T or L terminal according as to whether a pattern which is more like a T or more like an L is projected on to the photo cell array.

If output voltage is present at both terminals for a given pattern projected on to the array there may be some uncertainty as to whether it is a T or L pattern which is being projected. In order to provide a clear indication, an additional unit 3B is provided which includes amplifiers E connected with the output terminals T and L and a common negative feedback system which operates as a contrast magnifier to reduce the output of all the amplifiers E to a low value with the exception of that one which has the highest input. The outputs of these E amplifiers which are essentially of the kind described with reference to FIGURE 8, may be applied to operate an indicator such as a lamp or to a relay.

Since after the amplifiers D1 and D2 have been set up for the recognition of the particular pattern they will have definite values of gain, which however may be less than unity but always positive or zero, and may be represented by a definite value of attenuation, it is convenient to replace the unit 2B by a unit 2C such as is shown in FIGURE 10 in which each amplifier D1 or D2 of the unit 2B is replaced by a potential divider PD or even by a network of fixed resistors which is set up to give a desired value of attenuation in each channel in the unit.

The unit 2B is, however, useful in setting up a system for a particular problem in recognition since it would be an exceedingly difficult matter to establish by calculation the gain which is required by the various amplifiers D in the unit 2B or equivalently the required attenuation in the unit 2C. However, once the gains of the amplifiers D have been established these values can be measured and a unit 2C can be very quickly constructed for the particular problem concerned.

FIGURE 7 shows one form of the amplifier A or C as used in the units 1A and 2A. This amplifier consists of two directly coupled stages in which the input is applied to the grid of the valve V1 and the output is taken from the cathode of the valve V2. A diode D is connected with its anode to the grid of the valve V1 and with its cathode to earth. The amplifier thus amplifies and reverses in phase applied negative signals while the diode short-circuits applied positive signals, thus producing a zero output from the amplifier if positive signals are applied.

FIGURE 8 shows one form of the amplifier B or E such as is used in the units 1B and 3B. This amplifier corresponds to that shown in FIGURE 7 with the exception that the connections of the diode D are reversed so that this diode operates to short-circuit applied negative signals.

FIGURE 9 shows one form of the amplifier D which is used in the unit 2B. The valves V1 and V2 form together a pulse generator producing at the anode of the valve V2 output pulses having a frequency proportional to the magnitude of the applied positive input. The diode D1 operates in known manner as a D.C. restorer and the positive-going pulses are clipped by diode D2 and applied through a smoothing circuit to the valve V3 from which the output signals are obtained from the cathode. The bias on the diode D2 is controlled through the valve V4 by the voltage on the low leakage memory capacitor C which is charged by current flowing through the diode D3 whenever impulses appear at the anode of valve V2. The valve V4 operates as a cathode follower and the cathode of the diode D2 is connected as shown to a tapping on a resistor in the cathode circuit of the valve V4. Accordingly, as the positive output pulses from the valve V2 increase the positive charge on C, the grid of the valve V4 will go more positive and owing to increase in anode current in this valve the cathode of the diode D2 will go more positive, thus increasing the value of positive potential at which the output pulses are clipped. The time constant of the capacitor circuit may be made as long as an hour but in many applications a more permanent memory will be required. Two possibilities are envisaged, the capacitor C may be replaced by a potentiometer the shaft of which is rotated through suitable gearing by an electric motor controlled by the signals at the anode of valve V2 so that the revolutions of the motor are proportional to the integral of the signal applied to the grid of valve V1. Since, however, the setting up procedure may in most cases be completed it will be possible to measure the amplifier gains after setting up has been completed and then to replace the variable gain amplifier by a fixed resistor network.

The signals produced when a T shape is recognised by the apparatus will now be traced throughout the entire system. Referring to FIGURE 3 and following the signals through the units from left to right, the first unit P is the transducer matrix for example of photo cells shown in FIGURE 4, or one of the alternative devices for obtaining signals from an intensity distribution. The T shape will be assumed to be brighter than the background and since the photo cells integrate the light they receive, photo cells P2, P5, P7, P8 and P9 will clearly be seen from FIGURE 4A to receive larger inputs than photo cells P1, P3, P4 and P6, which only receive the background illumination. This is true for a T of any intensity greater than the background intensity and for any background intensity. The outputs of the nine photo cells, which will be assumed to be negative voltages, are supplied to unit 1A shown in FIGURE 4

Assuming for simplicity that the outputs of the photocells P2, P5, P7, P8 and P9 are 10 volts negative and the outputs of the photo cells P1, P3, P4 and P6 are zero volts, it will be seen that amplifier A1 receives a zero voltage through its input resistor R*i* (FIG. 4) and positive voltage (values determined below) through feedback resistors R*f* (FIG. 5) of the associated resistance network RN from output terminals O numbered 2, 5 and 4, i.e. the nearest output terminals. The positive or zero output voltages of unit 1A at terminals O1, O2 . . . O9 will be denoted by the same references and it can be shown by well known methods that the resultant input voltage to amplifier A1 is, where $A1_0$ equal the initial input voltage to amplifier A1 (i.e., the output from photocell P1), $$(Al_0)\frac{Rf}{Rf+8Ri}+\frac{Ri}{Rf+8Ri}(O2+O4+O5)$$

Since the output voltages O2 and O5 of amplifiers A2 and A5 are positive and $A1_0$ along with O4 are zero, the resultant input to amplifier A1 can only be positive under the assumed circumstances. Further, since amplifier A1 (as well as each of the other A amplifiers) is not allowed to operate on positive input voltages (because each contains a diode which grounds such voltages; see D in FIG. 7), the output voltage O1 must be zero.

If $Rf=8Ri$ and the gain of amplifiers A1 to A9 is −2, we find that the expressions for the other output voltages are:

O2=+10−⅛(O1+O3+O4+O5+O6)
O3=0
O4=0
O5=+10−⅛(O1+O2+O3+O4+O6+O7+O8+O9)
O6=0
O7=+10−⅛(O4+O5+O8)
O8=+10−⅛(O4+O5+O6+O7+O9)
O9=+10−⅛(O5+O6+O8)

Solving these equations for the non-zero output voltages from the A amplifiers, the following is obtained:

O2=+9.3 volts
O5=+5.7 volts
O7=+8.4 volts
O8=+7.2 volts
O9=+8.4 volts and O1=O3=O4=O6=0 volts.

These are the inputs to unit 1B which functions in exactly the same way as unit 1A except that it is designed to accept positve input voltages and to deliver negative or zero output voltages. The output voltages of unit 1B that are not zero are found to be:

O2=−9.0 volts
O5=−2.0 volts
O7=−8.0 volts
O8=−4.7 volts
O9=−8.0 volts and O1=O3=O4=O6=0 volts.

It will be seen that the outputs of unit 1A thus form a new voltage distribution in which the ends of the T are accentuated (A output voltages O2, O7, O9 are the highest), and this effect is further enhanced by unit 1B with the result that the negative output voltages appearing at terminals O2, O7 and O9 of unit 1B are much larger than the voltages at the other terminals, although their absolute values still depend linearly on the intensity of the T shape and the background.

The negative output voltages of unit 1B supply the busbars labelled 1 to 9 of unit 2A (FIG. 6). This unit contains eight sets of resistor adding networks RA that form the sums of sets of the negative busbar voltages and a positive feedback voltage on the additional busbar 10 connected to the cathodes of all the retifiers R in FIGURE 6. Because busbars 2, 7 and 9 carry the largest voltages, it is clear that amplifier C3 will have the largest input and hence the largest output. The common feedback is all produced by this amplifier through its rectifier which is the only one conducting and cancels out the inputs to the resistor adding networks of the other C amplifiers, leaving the positive output voltage of amplifier C3 the only non-zero output. (In some cases the cancellation may only be partial and when this occurs some of the other C amplifiers will give small outputs.)

If the three resistors RA and the resistor RF connected to the input terminal of each amplifier C1 to C8 are equal, it can be shown by well-known circuit analysis that the input to amplifier C1 is $$\tfrac{1}{4}[(O9+O7+O1)+Vk]$$

where $Vk$ is the magnitude of the positive voltage on the common cathode busbar 10 of the rectifiers R in FIG. 6. If the gain of each C amplifier is −40 then the output of C1 is $$O_{C1}=-10[O9+O7+O1+Vk]$$

It will be noted that $Vk$ must be equal in magnitude to the cathode voltage of the rectifier R that is conducting, i.e. the rectifier with the most positive anode voltage. It will be clear that the C amplifier giving the largest positive output will be the one that receives the largest negative input contribution from the nine busbars. The inputs to the amplifiers taken in order are as follows.

Input to C1 $=\tfrac{1}{4}(-8.0-8.0+Vk)$
Input to C2 $=\tfrac{1}{4}(-8.0+Vk)$
Input to C3 $=\tfrac{1}{4}(-9.0-8.0-9.0+Vk)$
Input to C4 $=\tfrac{1}{4}(-8.0+Vk)$
Input to C5 $=\tfrac{1}{4}(-8.0-8.0+Vk)$
Input to C6 $=\tfrac{1}{4}(-8.0+Vk)$
Input to C7 $=\tfrac{1}{4}(-8.0+Vk)$
Input to C8 $=\tfrac{1}{4}(-4.7+Vk)$ Amplifier C3 will be seen to receive the largest negative signal and this is the amplifier that determines $Vk$. Since the resultant $Vk$ is approximately the output of amplifier C3 initially, it may be derived as follows:

$$Vk=-10(-26+Vk)$$

$$Vk(1+10)=260$$

$$Vk=\frac{260}{11}=+23.6\text{ volts}$$

When this value is substituted into the input voltage equations, we find that all the amplifiers except C3 would then receive positive input voltages; but because each C amplifier is like that shown in FIG. 7 and includes diode D grounding out positive input voltages, it follows that each of the amplifiers except C3 gives a zero output voltage. The resultant output of amplifier C3, when its gain is −40, is then approximately:

$$-10(-26+23.6)=+24\text{ volts}$$

The positive output of 24 volts from amplifier C3 may be supplied either to unit 2B (FIG. 6) or to unit 2C (FIG. 10). Consider firstly the unit 2B.

The 24 volts is supplied to the input resistors of the third set of amplifiers D1 and D2 in unit 2B. The circuit of these D amplifiers is shown in FIG. 9. If the switches L and T are closed, the diodes S hold the input terminals of the amplifiers D at earth or zero potential. The switch labelled T is now opened and the clamping effect of the left-hand diode S of the third-pair is thereby removed. The cathodes of the remaining seven left-hand diodes are also released, but because the voltages supplied to the input resistors of the other D1 amplifiers are zero, there is still no input to these amplifiers.

The effect of the 24 volts on the third D1 amplifier is two-fold: it causes D1 to provide an output signal which is proportional in amplitude both to the time the input signal exists and to the amplitude of that signal; i.e., the input signal causes from D1 an output signal proportional to the voltage time integral of the input signal. Valves V1 and V2 in FIG. 9 are driven to generate output pulses at a rate proportional to the voltage supplied, for example 240 pulses per second in response to 24 volts, i.e., 10 pulses per second per volt input. These positive pulses begin to charge the capacitor C through the diode D3 so that the voltage on capacitor C is at least approximately proportional to the number of pulses supplied; i.e., the voltage on C after 100 pulses is about 10 volts, and after 240 pulses approximately 24 volts. Thus if the switch T is opened for one second when the T shape is present on the photocell mosaic P, the capacitor C of the third D1 amplifier becomes charged to 24 volts. This voltage limits the size of the pulses reaching V3 because it controls the amplitude at which those pulses are clipped by diode D2 by biasing that diode at its cathode via V4. The capacitor at the grid of V3 smooths the amplitude limited pulses. When the circuit values are chosen so that the smoothed output for a pulse frequency of 300 per second and a pulse height of 10 volts is approximately 10 volts, it follows that the smoothed output voltage for a pulse frequency of 240 per second and a pulse height of 24 volts is 19.2 volts. This is the voltage supplied by the third D1 amplifier through the output resistor connected to the lower busbar T in FIG. 6. The voltage supplied to the remaining seven output resistors is zero since no pulses are generated by the zero input to the other D1 amplifiers.

The unit 3B (FIG. 6) is supplied by the L and T busbars. The L busbar gives no voltage since the L key switch is not open. The T busbar can be shown by circuit theory to produce an input component to the amplifier E2 given approximately by $\tfrac{1}{16}\times 19.2$ volts, all the resistors being equal. This input component is reduced by negative feedback from the output of amplifier E2 through the diode connected to this output. If the output of amplifier E2 is VT the feedback component is approximately $$\frac{VT}{2}$$

The resultant input to amplifier E2 is thus $$\frac{19.2}{16}+\frac{VT}{2}$$

and if the gain of amplifier E2 is −16 the output is $$VT=-16\left(\frac{19.2}{16}+\frac{VT}{2}\right)$$

and hence $$VT=-\frac{19.2}{9}=-2.1\text{ volts approx.}$$

The output of amplifier E1 is zero and the presence of the non-zero negative output of 2.1 volts at the output of amplifier E2 indicates the presence of the T shape. If both switches L and T are left open, amplifier E2 gives a negative output voltage whenever the T is presented but not when an L is presented. This output voltage may be used to close a relay.

It will be noted that the third amplifier D1 of unit 2B has a gain of $$\frac{19.2}{24.0}=0.8$$

after this setting-up procedure, and that it can be replaced by the corresponding potential divider PD of unit 2C (FIG. 10). This potential divider is arranged to give an output that is 0.8 times the input and may consist of fixed resistors if the application is fixed. The remaining potential dividers give infinite attenuation or zero output unitl they are set up according to the gain of the corresponding D amplifier for the recognition of other patterns etc.

It will be appreciated that the change of gain of the D amplifiers that is produced by presenting shapes and pressing key switches to indicate their classification can only last for as long as the capacitor C of the D amplifiers will hold its charge. Although this may be approximately up to an hour perhaps, it is essential to replace these D amplifiers by the resistor attenuators of unit 2C if the apparatus is to function indefinitely.

As indicated in FIGURE 10, the outputs from the potential dividers PD of unit 2C are applied to busbars L and T and thence to unit 3B which operate exactly as described above with reference to FIGURE 6.

It will be noted that the outputs from the unit 3B (whether the unit 2B or the unit 2C is used) will indicate the nature of the pattern presented to the photocell mosaic, unit P, while the magnitude of the output will dedend on the intensity of the pattern in relation to its background. Thus it is possible for the apparatus to recognize a shape that is only just bright enough to overcome the noise of the system, the single non-zero output voltage indicating the type of shape being presented. If the outputs of unit 3B are connected to relays that operate at a certain threshold voltage, the closing of, for example, the relay connected to the output of amplifier E2 indicates that a T of intensity greater than a corresponding threshold intensity is being presented. It will be noted that the non-zero output voltage indicating the presence of the T appears immediately the T is presented and remains approximately constant as long as the T is present in any position on the mosaic, assuming the mosaic to be large enough. There is no delay due to any scanning or computation process. The correct indication is obtained for any intensity of T and background that does not overload the apparatus or get lost in the noise and also for any different style of T that produces a larger voltage at the T busbar than at the L busbar in FIGURE 6.

Figures 11, 12, 13:
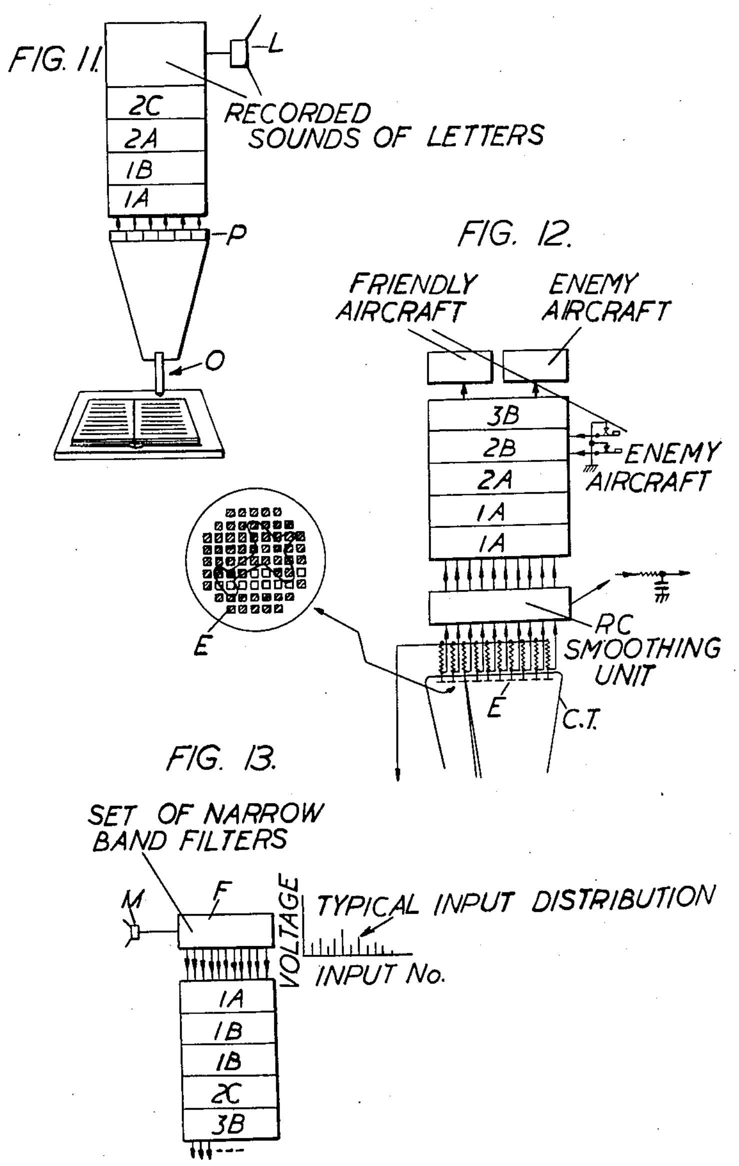

FIGURE 11 illustrates a system of the kind described which is set up for use in reading printed matter. In this arrangement an optical system O is arranged to project printed matter letter by letter on to the photo cell array P and by means of the units 1A, 1B, 2A, 2C and 3B relays may be operated which select the recorded sounds of the individual letters as they are recognised and these sounds are reproduced by a loud speaker L which in effect act to spell out words as they are projected letter by letter on to the photo cell array. In this example, and since the number of letters to be recognised are known, the unit 2C will be used in preference to the unit 2B although this latter unit will, of course, be used in the initial setting up of the system.

The application of the system for the recognition of aircraft is illustrated in FIGURE 12. In this case it is assumed that a silhouette of the aircraft to be recognised will be presented on the screen of a cathode ray tube CT and in such case the tube may be provided with a mosaic of collecting electrodes E arranged adjacent the screen, each electrode being connected through resistance with the cathode of the tube. Such electrodes will become charged when the beam impinges on them according to the pattern of light and shade being created on the screen and the voltages on these electrodes can be applied after smoothing directly to the amplifiers A of the unit 1A. Alternatively, it would of course bo possible to project a silhouette of the aircraft on to an array of photo-electric cells in the manner shown in FIGURE 4. In either case the system would include the units 1B, 2A, 2B (or 2C) and 3B arranged as previously described.

The illustrated system also shows an alternative aspect of the invention inasmuch as the system can be taught to recognise one or more groups of patterns and to indicate to which group a particular pattern belongs. In the present case the system is arranged to indicate whether the outline of an aircraft is that of a friendly or an enemy aircraft, and since there are in effect only two alternative sets to be recognised, the unit 2B may be arranged exactly as shown in FIGURE 6, except that in practice there will be many more than the eight amplifiers C shown.

In setting up the system, outlines of the two groups of aircraft are presented on the screen of the cathode ray tube or equivalently to the photo cell array, the outlines of each individual aircraft being shown in all possible aspects, and the gains of the amplifiers D in the unit 2D are appropriately adjusted automatically to determine whether a given pattern falls into the friendly or enemy aircraft group.

It will be appreciated that if required the system could be modified to indicate specific types of aircraft provided of course that the necessary modification were made to the 2B or 2C units.

FIGURE 13 illustrates the application of the system of the invention to a one-dimensional distribution of variables which in the example shown may be those of complex waveforms which are associated with speech sounds. The speech sounds picked up by a microphone M are analysed by applying the waveform to a series of narrow band pass filters F which cover the range of audio frequencies concerned, and the voltage output from the filters which corresponds to the acoustic power in the pass band concerned produce typical distribution patterns which may be recognised as specific speech sounds whether spoken, for example, by a male or a female voice. The voltage outputs from the filters are applied to the inputs of the amplifier A of unit 1A and the system comprises also the units 1B, 2A, 2B or 2C, and 3B but in this case, as compared with the previously described examples, there will be only one row in each of the RN networks employed with a corresponding reduction in the number of A and B amplifiers required in the 1A and 1B units. The 3B unit may be used to operate indicators which identify the various speech sounds or, for example, they may be used to effect such control operations according to the nature of the spoken words or phrases.

In some applications it may be convenient to reduce the dimensionality of a spatial distribution of a variable quantity before obtaining the signals for feeding into the recognition apparatus. An example of how a two-dimensional light intensity distribution might be reduced to a one-dimensional amplitude distribution is shown in FIGURE 14. The two-dimensional distribution shown which might be a printed letter is scanned by a spot of light generated by a television type of flying spot scanner R. A photo cell P is arranged to collect the reflected (or transmitted) light so that the output voltage of the photo cell at any instant of time is proportional to the light reflected from a point of the distribution. This voltage is applied in synchronism with the time base of the scanner by means of a mechanical or electronic switch S to each in turn of a number of resistor-capacitor smoothing circuits RC and the distribution of average voltages on the capacitors is the required one-dimensional distribution. Even when it is required to preserve the two-dimensional array the above method may be used to reduce the number of photo cells to one at the expense of having to introduce the flying spot scanner, switching and smoothing apparatus.

There may be applications of the invention which require the highest possible resolution and this is obtained by letting N equal the number of sample points or the number of busbars in FIGURE 6 and by making D (distance between sample points) equal to zero. As shown in FIGURE 15, the amplifiers C in unit 2A are arranged to have all possible connections through resistors R1 with N or less of the busbars B1 (excluding the case of zero connections) and the number of C amplifiers required, for an array of nine photo cells, is therefore $2^9 - 1$ or 511 as compared with eight in the system as illustrated in FIGURE 6. The 1A and 1B units are not required in a system of this type since every feature of the distribution is taken into account and there is no need to derive larger signals from corners or other regions of the distribution at which the magnitude changes.

An increase in the amplitude contrast between signals obtained from different distributions may be obtained by letting each C amplifier have a total of inputs equal to the number of sample points (in the example nine) obtained by making connections to a second set of nine busbars B2 through diodes D (or non-linear resistors) and resistors R2. The connections made by resistors alone remain as above but those amplifiers having less than nine connections to the first set of busbars B1 will have the total of nine made up by connections through the diodes D to the second set of busbars B2. The second set of busbars are connected in order to the first set through phase reversing amplifiers AR and the diodes are arranged so that they only conduct when the busbar to which they are connected carries a signal. In the arrangement illustrated in FIGURE 15 only three of the 511 C amplifiers are shown with their input connections. The arrangement illustrated would be followed by a 2B, or 2C, and 3B unit which operate in the manner described above.

It is clearly possible to make many other systems of connection through resistors and diodes (or non-linear resistors) either with or without the second set of busbars and with or without the 1A and 1B units. The choice will depend on the complexity of the distributions to be recognised and the accuracy of discrimination required.

The system of this invention may be used for many purposes and the system output may be used to control various operations of which the following are examples:

(1) Operate anti-aircraft gun when given types of aircraft are recognised.
(2) Operate telephone exchange switchgear in response to spoken words.
(3) Operate typewriter keys in response to spoken words.
(4) Select particular shapes of objects in automatic sorting system.
(5) Produce sounds corresponding to printed symbols or letter sequences.

Some convenient devices for storing the information with which to modify the response of the memory units are cathode ray tube stores, electrostatic and magnetic stores. An economical transfer unit may be constructed with a magnetic core having suitable windings for input, output and control signals, the gain of the unit being varied as in a magnetic amplifier.

Instead of using a large number of discrete units in parallel the signals may be stored on surfaces in cathode ray tubes and obtained as required by scanning the surface with an electron beam. The signals need not be generated by the direct method but may be synthesized by generating signals to represent the terms of a series expansion, the desired results being obtained approximately by adding the signals, representing the first few terms of the series.

What I claim is:

1. A system for analysing a single or multiple dimensional spatial distribution of a variable quantity including means for simultaneously producing signals having a magnitude which is proportional to the magnitude of the quantity at each of a plurality of zones in the distribution and means connected to said means for producing signals and operating simultaneously on all said signals such that larger signals are obtained from those zones in the distribution over which the quantity changes in magnitude or in spatial configuration and smaller or zero signals are obtained from those zones of the distribution over which the magnitude of the quantity is relatively constant.

2. A system for analysing the spatial distribution of a variable quantity including a plurality of transducers arranged in an array and simultaneously providing signals having a magnitude proportional to the magnitude of the quantity at a plurality of zones in the distribution, a plurality of amplifiers each having an input terminal connected with a respective transducer, a feedback terminal and an output terminal, and a resistance network connected with said output terminals and with said feedback terminals, said network being arranged to provide, as feedback to an amplifier receiving input from a first transducer, signals obtained from the outputs of a number of other amplifiers which receive inputs from transducers arranged in the vicinity of said first transducer in the said array.

3. A system for the recognition of characteristic patterns in the distribution of a variable quantity including means for simultaneously obtaining signals representative of the magnitude of the quantity at a plurality of zones in the distribution, means connected to said means for obtaining signals for subtracting from each signal signals obtained from adjacent zones in the distribution to provide output signals only from those zones of the distribution where the variable quantity changes significantly in magnitude, a plurality of memory units and means connected between said means for subtracting and said memory units for applying said output signals to activate said memory units whereby there is provided a selective response to the said characteristic patterns.

4. A system for the recognition of characteristic patterns in the distribution of a variable quantity including a plurality of transducers simultaneously providing signals having a magnitude proportional to the magnitude of the quantity at respective zones in the distribution, a plurality of amplifiers, each having an input terminal connected with a respective transducer, a feedback terminal and an output terminal, a resistance network connecting all said feedback terminals and said output terminals such that the output of one amplifier is applied as feedback to the input of adjacent amplifiers, means connected to said amplifiers for combining the outputs of all said amplifiers in sets of outputs selected from amplifiers the respective transducers of which are not mutually adjacent one another, a second plurality of amplifiers equal in number to the number of sets of outputs, common feedback means connecting the outputs of each of said second plurality of amplifiers with all the inputs to said second amplifiers such that output is obtained from those second amplifiers to which the set or sets of outputs having a maximum value is applied, at least two further amplifiers connected to said second plurality of amplifiers receiving inputs from each amplifier of said second plurality of amplifiers and supplying output to respective common output terminals representative of characteristic patterns, and means connected to said further amplifiers for feeding a code signal representative of a selected characteristic pattern to each of said further amplifiers.

5. A system for the recognition of characteristic patterns in a spatial distribution of variable quantity including means for simultaneously deriving signals from selected zones in the distribution, said signals being representative of the magnitude of the quantity in such zone, means connected to said means for deriving signals for combining said signals in sets representing all possible combinations of said signals, and means connected to said combining means for effecting an automatic response to maximum values in said sets of signals representing a characteristic pattern to be recognized 6. A system for the recognition of characteristic patterns in a spatial distribution of a variable quantity including an array of transducers each simultaneously providing a signal representative of the magnitude of the quantity at a selected point in the distribution, adding means connected to said transducers for combining all said signals in sets each containing signals derived from transducers mutually separated in the array, a plurality of amplifiers equal in number to the number of sets of signals connected to said adding means for amplifying repective sets of signals, feedback means common to said plurality of amplifiers for increasing the relative contrast in the outputs from said amplifiers, a plurality of means for indicating the presence in the distribution of selected characteristic patterns and weighting means connecting the outputs of each of said amplifiers with each of said plurality of indicating means.

7. A system as claimed in claim 6, in which said weighting means include attenuating networks adjusted to favour the transmission to a particular indicating means of output from those of said amplifiers which have maximum outputs when the distribution exhibits the characteristic pattern represented by said indicating means.

8. A system as claimed in claim 6, in which said weighting means include amplifiers which have a gain proportional to the time integral of an applied input, whereby the gain of said amplifiers may be adjusted by applying to the system distributions of the said variable quantity which exhibit a selected characteristic pattern.

9. A system for the recognition of characteristic patterns in the distribution of a variable quantity including a plurality of transducers arranged in a given array for simultaneously providing a like plurality of output signals each proportional to the magnitude of the quantity in the zone in which the respective transducer is located, a first plurality of adding means connected to said transducers for modifying the output signal from each one of the transducers with output signals from other transducers located in the vicinity of said one transducer, the said adding means operating to provide modified transducer output signals, which are greater as regards respective transducers located in zones where the quantity changes in magnitude and smaller or zero as regards respective transducers located in zones where the quantity is relatively constant, a second plurality of adding means for combining all said modified output signals into sets each containing signals derived from transducers not mutually adjacent one another, and means connected with said second plurality of adding means for automatically effecting an output when the modified output signals in any one set thereof have maximum values representing characteristic patterns.

10. A system according to claim 3 including a plurality of means for indicating the presence in the distribution of selected characteristic patterns and means for connecting the outputs of each of said memory units with each of said indicating means.

11. A system for the recognition of characteristic patterns in a spatial distribution of a variable quantity including an array of transducers each simultaneously providing a signal representative of the magnitude of the quantity at a selected point in the distribution, adding means connected to said transducers for combining all said signals in sets, a plurality of amplifiers equal in number to the number of sets of signals connected to said adding means for amplifying respective sets of signals, feedback means common to said plurality of amplifiers for increasing the relative contrast in the outputs from said amplifiers, a plurality of means for indicating the presence in the distribution of selected characteristic patterns, and weighting means connecting the outputs of each of said amplifiers with each of said plurality of indicating means.

References Cited in the file of this patent

UNITED STATES PATENTS

| | | |
|---|---|---|
| 2,577,075 | Dickinson | Dec. 4, 1951 |
| 2,609,143 | Stibitz | Sept. 2, 1952 |
| 2,616,983 | Zworykin | Nov. 4, 1952 |
| 2,624,786 | Potter | Jan. 6, 1953 |
| 2,700,756 | Estrems | Jan. 25, 1955 |
| 2,751,433 | Linger | June 19, 1956 |
| 2,756,409 | Lubkin | July 24, 1956 |
| 2,763,854 | Oliwa | Sept. 18, 1956 |
| 2,766,444 | Sheftelman | Oct. 9, 1956 |
| 2,774,066 | Stafford | Dec. 11, 1956 |
| 2,794,965 | Yost | June 4, 1957 |
| 2,821,696 | Shiowitz | Jan. 28, 1958 |

OTHER REFERENCES (1) "Electronic Circuits of the NAREC Computer," by Sheretz.

(2) "Computers and Automata," by Shannon.

(3) "Proceedings of IRE," pp. 1319 and 1234 to 1241, October 1953.

(Articles (1) and (2) are found in publication (3).)